United States Patent
Hamilton, Jr. et al.

(10) Patent No.: US 6,323,855 B1
(45) Date of Patent: Nov. 27, 2001

(54) SHARPENING EDGE FEATURES IN DIGITAL IMAGE PROVIDING HIGH FREQUENCY EDGE ENHANCEMENT

(75) Inventors: John F. Hamilton, Jr.; James E. Adams, Jr., both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/208,362

(22) Filed: Dec. 10, 1998

(51) Int. Cl.$^7$ .................................................. G06T 17/00
(52) U.S. Cl. ........................ 345/418; 345/419; 382/254
(58) Field of Search .................................. 345/418, 419; 382/254, 268, 266, 162

(56) References Cited

U.S. PATENT DOCUMENTS 6,005,983 * 12/1999 Anderson et al. .................... 382/254
6,038,348 * 3/2000 Carley .................................. 382/268

* cited by examiner

Primary Examiner—Cliff N. Vo
(74) Attorney, Agent, or Firm—Raymond L. Owens

(57) ABSTRACT

A method of sharpening edge features in a digital image having pixels which provide high spatial frequency edge enhancement including acquiring a digital image; computing an edge boost record having positive and negative boost values for different portions of the edge regions in a digital image; and modifying the edge boost values of edge related pixels in accordance with an edge boost modification function selected to provide an edge enhanced digital image.

4 Claims, 4 Drawing Sheets

SHARPENING EDGE FEATURES IN DIGITAL IMAGE PROVIDING HIGH FREQUENCY EDGE ENHANCEMENT

CROSS REFERENCE TO RELATED APPLICATIONS

Reference is made to commonly assigned U.S. patent application Ser. No. 09/156,480 filed Sep. 18, 1998, entitled "Edge Enhancement Using Modified Edge Boost Function" to John F. Hamilton, et al., the disclosure of which is incorporated herein by reference.

FIELD OF THE INVENTION

This invention relates to sharpening edges in digital images to provide high frequency edge enhancement.

BACKGROUND OF THE INVENTION

Currently, digital images are derived through various devices including digital cameras and the digital scanning of film images. Many times the sharpness of an image is degraded by optical elements or by irregularities in the image sensor. For these reasons, it is often desirable to sharpen an image after it has been converted to a digital form. Conventional sharpening methods, such as unsharp masking, achieve the appearance of edge sharpening by locally lightening the lighter portion of an edge region and locally darkening the darker portion of an edge region. The resulting increase in microcontrast provides the sharpening effect. Such methods can be applied to black and white digital images as well as to colored digital images.

Referring to FIG. 1A, a one dimensional trace of an edge profile is shown in which higher code values correspond to lighter shades and lower code values to darker shades. In FIG. 1B, the same edge profile has been further blurred in accordance with the prior art technique of unsharp masking. The curve in FIG. 1B is subtracted from the curve in FIG. 1A and the resulting curve shown in FIG. 1C in which the amplitudes P and N, for positive and negative boost respectively, are approximately the same size. The difference curve of FIG. 1C is added to the original curve in FIG. 1A and this final curve, shown in FIG. 1D, depicts the profile of the sharpened edge. Although unsharp masking was originally a film technique, it also has a digital version. Shown in FIGS. 2, 3A and 3B are examples of boost kernels which, when applied to a digital image, directly produce boost values analogous to those shown in FIG. 1C and sharpened edges analogous to those shown in FIG. 1D.

When these conventional sharpening methods are applied to noisy images, high spatial frequency boost kernels (such as the 3×3 kernel shown in FIG. 2) tend to amplify the noise as well as image edge features. Excessive noise amplification may be reduced by using a mid-range spatial frequency boost kernel (such as the 5×5 kernels shown in FIGS. 3A and 3B), however, image edge features are primarily enhanced in the mid-range of spatial frequencies.

SUMMARY OF THE INVENTION

It is an object of the present invention to provide a method of edge sharpening which provides high spatial frequency enhancement of image edge features and reduces high frequency noise amplification.

These objects are achieved by a method of sharpening edge features in a digital image having pixels which provide high spatial frequency edge enhancement, comprising the steps of:

a) acquiring a digital image;
b) computing an edge boost record having positive and negative boost values for different portions of the edge regions in a digital image; and
c) modifying the edge boost values of edge related pixels in accordance with an edge boost modification function selected to provide an edge enhanced digital image.

ADVANTAGES

Digital images are often in need of sharpening and conventional sharpening often amplifies unwanted high frequency noise. The present invention achieves high frequency edge enhancement. At the same time as the present invention performs the high frequency edge enhancement, it does not amplify undesirable high frequency noise thereby maintaining such noise at acceptable levels.

The present invention makes use of the fact that the magnitude of an edge feature is related to both the absolute size of the boost values and their spatial separation in the boost record.

This is accomplished by separating edge enhancement into two parts. The first part, edge feature detection, is done using a second order Laplacian kernel which is most sensitive to mid-range spatial frequencies. The second part, edge boost generation, is done using a high spatial frequency method, but applied only to those regions identified in the first step. In this way, the enhancement operation is applied to true image edge features, but not to high frequency noise which has only minor mid-range frequency content. The present invention may be used separately or in combination with other edge enhancement operations thus providing greater flexibility for artifact-free edge enhancement of digital images.

An important feature of the present invention is that mid-range spatial frequencies edge features are provided with high spatial frequency enhancement. The present invention advantageously sharpens edge features in a digital image having pixels while simultaneously providing high spatial frequency edge enhancement and reducing high frequency noise amplification.

BRIEF DESCRIPTION OF THE DRAWINGS

FIG. 2 depicts a prior art 3×3 boost kernel for producing positive and negative boosts;

FIGS. 3A–3B depict a prior art 5×5 boost kernel for producing positive and negative boosts;

FIGS. 6A–6C show examples of edge boost modification kernels.

DETAILED DESCRIPTION OF THE INVENTION

Figure 1A:
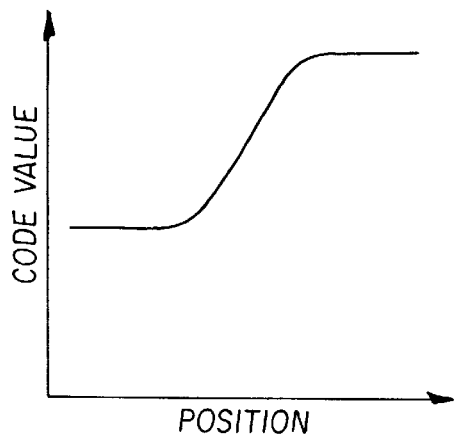
FIG. 1A is a graph of a prior art edge profile of a digital image taken with respect to position vs. code values.
Figure 1B:
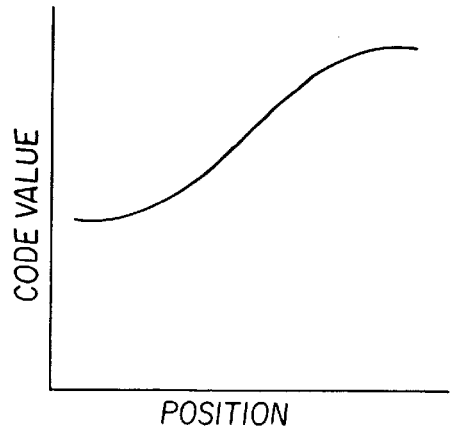
FIG. 1B is the profile of FIG. 1A which has been blurred in the prior process of unsharp masking.
Figure 1C:
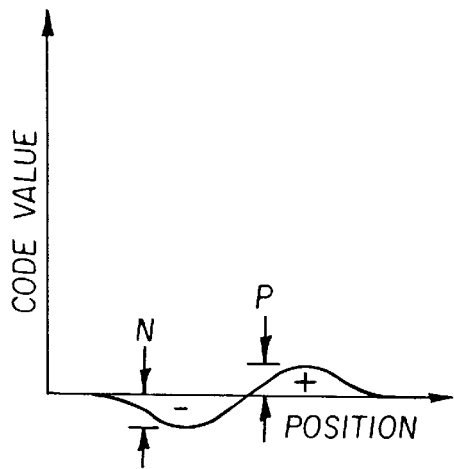
FIG. 1C depicts positive and negative boosts for image sharpening in the prior art.
Figure 1D:
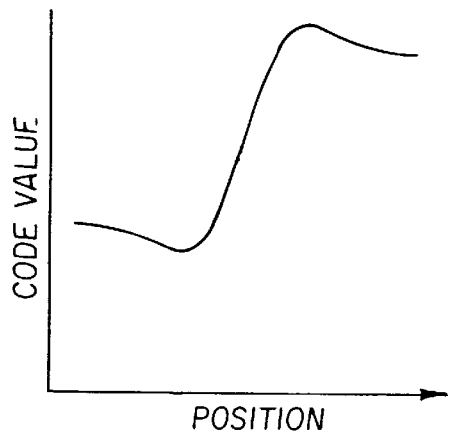
FIG. 1D is a graph depicting the application of the positive and negative boosts of FIG. 1C to the profile shown in FIG. 1A.
Figure 4:
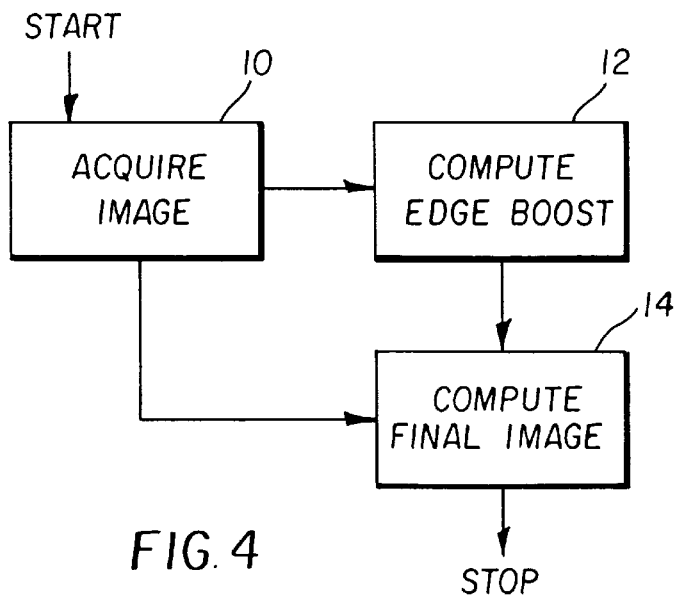
FIG. 4 shows, in block diagram form, the method of the present invention.

Referring to FIG. 4, the process of sharpening an image starts with the acquire image block 10 in which a digital image is obtained by conventional means such as scanning photographic film or direct capture by electronic camera. In the compute edge boost block 12, an edge boost record is derived from the acquired image. The term "edge boost record" as used herein refers to a record stored in memory which has both positive and negative boost values for different portions of edge regions in a digital image. As will be described hereinafter, the edge boost record is modified by adapting a blur kernel to the pixels of such edge boost record. The edge boost record and the acquired image are passed to the compute final image block 14 where they are combined to produce a sharpened image. For colored images, the pixels of the edge boost record are added or summed to the pixels of each of the red, green, and blue color records of the acquired image. If the acquired image is black and white, the usual method of combination is just the addition of the acquired image and the edge boost record.

Figures 2, 3A, 3B:
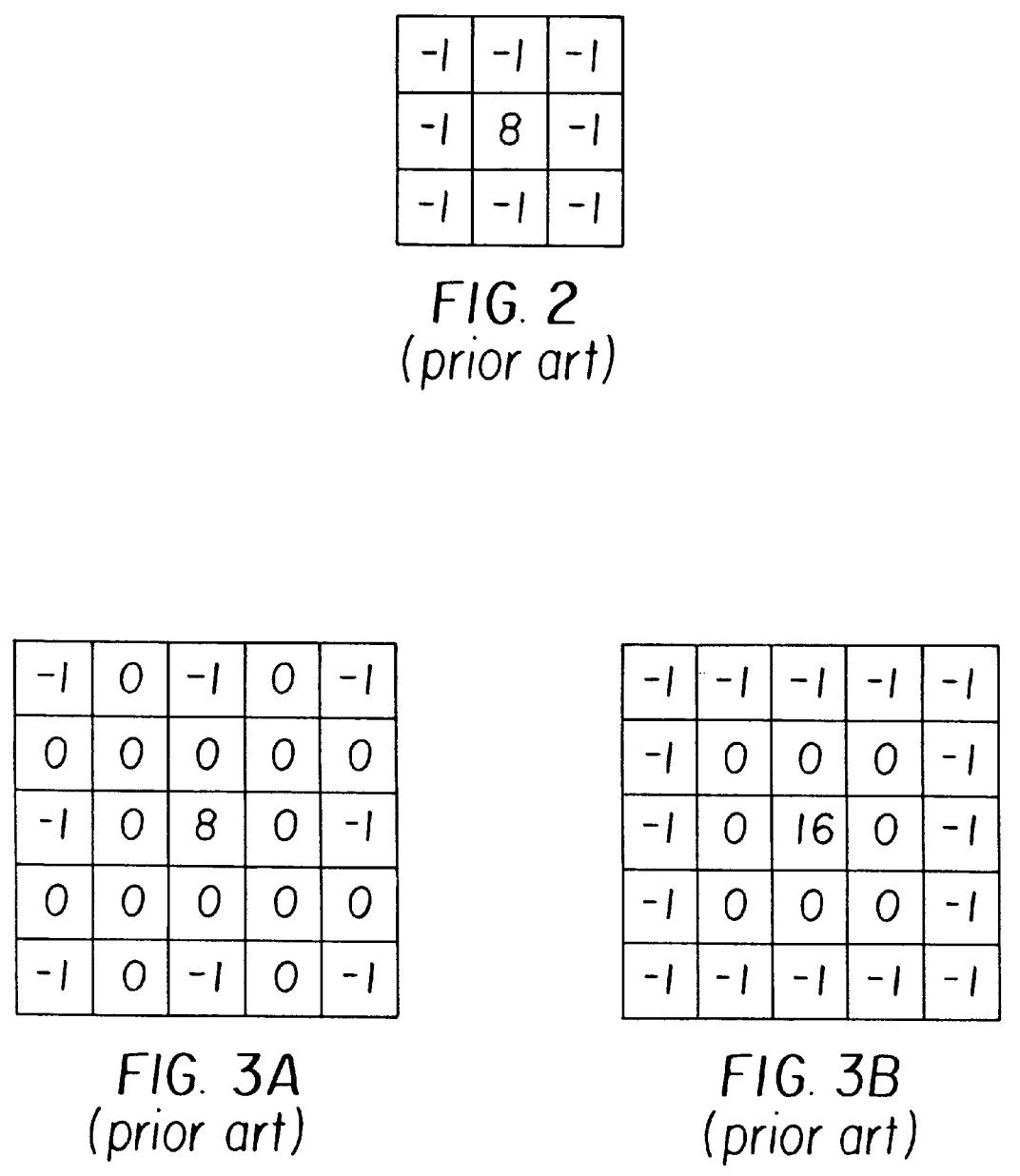
Figure 5:
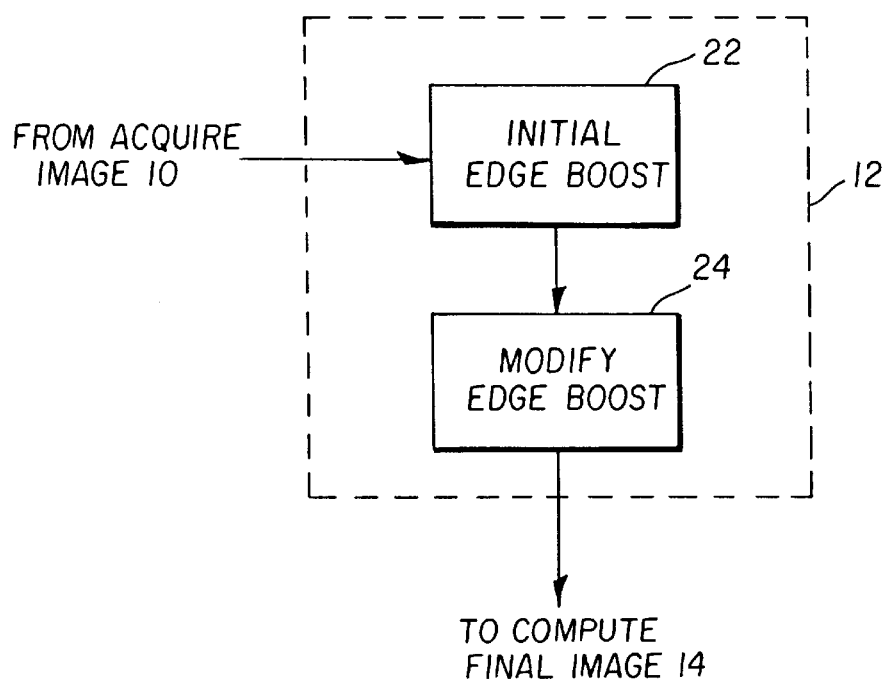
FIG. 5 shows a more detailed block diagram of the compute edge boost block shown in FIG. 4.

Details of the compute edge boost block 12 are shown in FIG. 5. The initial edge boost block 22 produces an initial edge boost record by conventional means such as by the application of a boost kernel, for example, see FIG. 2 and FIGS. 3A–3B. The initial edge boost record receives subsequent processing by the modify edge boost block 24. The subsequent processing of the initial edge boost record is an important feature of the present invention.

Within the modify edge boost block 24, each image pixel having a non-zero initial edge boost value is given an edge boost modification value. Each pixel having a positive initial edge boost value is modified according to how close it is to a pixel with a negative initial edge boost value. Each pixel having a negative initial edge boost value is modified according to how close it is to a pixel with a positive initial edge boost values. Pixels with an initial edge boost value of zero are unaffected.

A pixel which has a non-zero initial boost value, and which is sufficiently close to one or more pixels having non-zero initial boost values of opposite sign is referred to in the specification and claims as "an edge related pixel." Whether two pixels having initial boost values of opposite sign are sufficiently close is determined by an edge boost modification function (call it F) having the properties shown below.

Let the pixel of interest, with subscripts $(i_0, j_0)$, have an initial edge boost value $v_0$, and some other nearby pixel, with subscripts $(i_1, j_1)$, have an initial edge boost value $v_1$. Then, the edge boost modification function F has the following properties:

(i) $F(v_0, i_0, j_0; v_1, i_1, j_1) = 0$ if $0 \leq v_0 * v_1$ (ii) $F(v_0, i_0, j_0; v_1, i_1, j_1) \geq 0$ if $v_0 > 0$ and $v_1 < 0$ (iii) $F(v_0, i_0, j_0; v_1, i_1, j_1) \leq 0$ if $v_0 < 0$ and $v_1 > 0$ The edge boost modification (M) assigned to the pixel of interest is:

(i) $M(v_0, i_0, j_0) = \text{Max}\{F(v_0, i_0, j_0; v_1, i_1, j_1)\}$ over $(i_1, j_1)$ if $v_0 > 0$ (ii) $M(v_0, i_0, j_0) = \text{Min}\{F(v_0, i_0, j_0; v_1, i_1, j_1)\}$ over $(i_1, j_1)$ if $v_0 < 0$ Thus, the edge boost modification value $M(v_0, i_0, j_0)$ for a pixel of positive initial edge boost $(v_0 > 0)$ is the maximum value of $F((v_0, i_0, j_0; v_1, i_1, j_1)$ encountered as the subscripts $(i_1, j_1)$ are varied of the whole region of the image. Similarly, the edge boost modification value $M(v_0, i_0, j_0)$ for a pixel of negative initial edge boost $(v_0 < 0)$ is the minimum value of $F(v_0, i_0, j_0; v_1, i_1, j_1)$ encountered as the subscripts $(i_1, j_1)$ are varied of the whole region of the image. Edge related pixels are those for which the edge boost modification value is non-zero.

In a simpler form, the edge boost modification function depends only on the initial boost values of the pixels and the absolute value of the subscript differences between them. Thus, a simpler form would be:

$F(v_0, i_0, j_0; v_1, i_1, j_1) = G(v_0, v_1, |i_0 - i_1|, |j_0 - j_1|)$

Figures 6A, 6B, 6C:
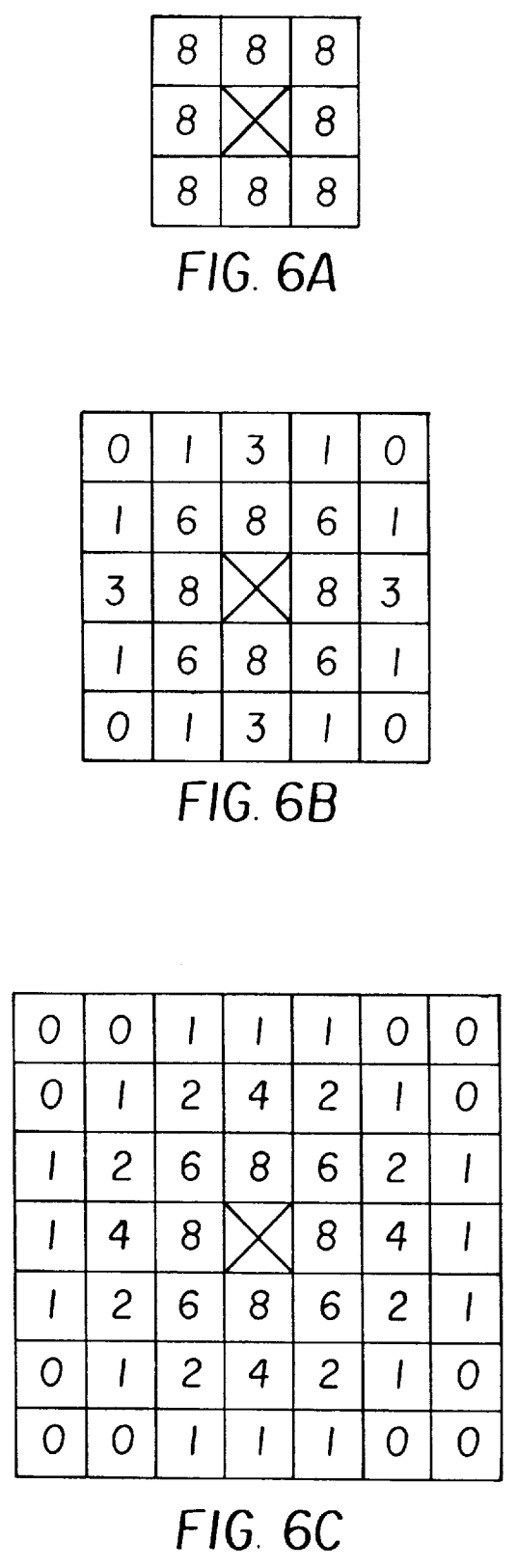

In a further simplification, the function G can be embodied in an edge boost modification kernel such as those shown in FIGS. 6A–6C. The mathematical relationships expressed by the function F can be determined by a digital computer either by using a computational algorithm or by using values stored in a kernel.

Examples of edge boost modification kernels are shown in FIGS. 6A–6C. A kernel is used by superimposing its center (the box marked "X") over an image pixel of interest and then looking at the neighboring pixels. For example, referring to the kernel shown in FIG. 6A, a pixel having a positive initial edge boost value, it would be increased by 8 if any of its nearest neighbors had a negative initial edge boost value. If more than one neighbor has a negative initial edge boost value, the center pixel just receives the largest modification. Each pixel with a positive initial edge boost value is processed in turn by centering the kernel on it and looking for neighbors with negative initial edge boost values.

Pixels having negative initial edge boost values are similarly modified. The same positive modification kernel may be used with the understanding that the modification values are subtracted, or a completely different modification kernel may be used having negative values. As before, if a negative boost pixel has more than one neighboring pixel with a positive initial edge boost value, the greatest modification (in absolute value) is applied. The kernels in FIGS. 6B–6C permit second and third nearest neighbors to influence edge boost modification. Any pixels outside the kernel region are ignored.

For greater flexibility in edge boost modification, the choice of kernel can depend on the sizes of positive and negative initial edge boost values. Thus, one could use the kernel of FIG. 6A for small positive initial edge boost values, the kernel of FIG. 6B for mid-range edge boost values, and the kernel of FIG. 6C for large edge boost values. The transitions between these categories can be defined abruptly by specifying thresholds, or smoothly by continuously changing weights applied to each kernel.

The process of modifying the edge boost record can be applied multiple times, and can be used in combination with other edge boost modification methods.

The method of the present invention for sharpening a digital image having pixels can be under the control of a computer program which is stored on a computer readable storage medium. The computer readable storage medium may comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST

10 acquire image block
12 compute edge boost block
14 compute final image block
22 initial edge boost block
24 modify edge boost block

What is claimed is:

1. A method of sharpening edge features in a digital image having pixels which provide high spatial frequency edge enhancement, comprising the steps of:
   a) acquiring a digital image;
   b) computing an edge boost record having positive and negative boost values for different portions of the edge regions in a digital image; and
   c) modifying the edge boost values of edge related pixels in accordance with an edge boost modification function selected to provide an edge enhanced digital image, by:
      (i) identifying edge related pixels; and
      (ii) modifying the edge boost value corresponding to each edge related pixel in accordance with the edge boost modification function which is related to the proximity of the pixel of interest to the nearest pixel having an edge boost value of opposite sign.

2. The method of claim 1 wherein the edge related pixels are restricted to those immediately adjacent to the center pixel.

3. A computer program product for sharpening edge features in a digital image having pixels which provide high spatial frequency edge enhancement, comprising a computer readable storage medium having a computer program stored thereon for performing the steps of:
   a) acquiring a digital image;
   b) computing an edge boost record having positive and negative boost values for different portions of the edge regions in a digital image; and
   c) modifying the edge boost values of edge related pixels in accordance with an edge boost modification function selected to provide an edge enhanced digital image, by:
      (i) identifying edge related pixels; and
      (ii) modifying the edge boost value corresponding to each edge related pixel in accordance with the edge boost modification function which is related to the proximity of the pixel of interest to the nearest pixel having an edge boost value of opposite sign.

4. The computer program product of claim 3 wherein the edge boost modification function is a kernel.

* * * * *